United States Patent Office 3,507,069
Patented Apr. 21, 1970

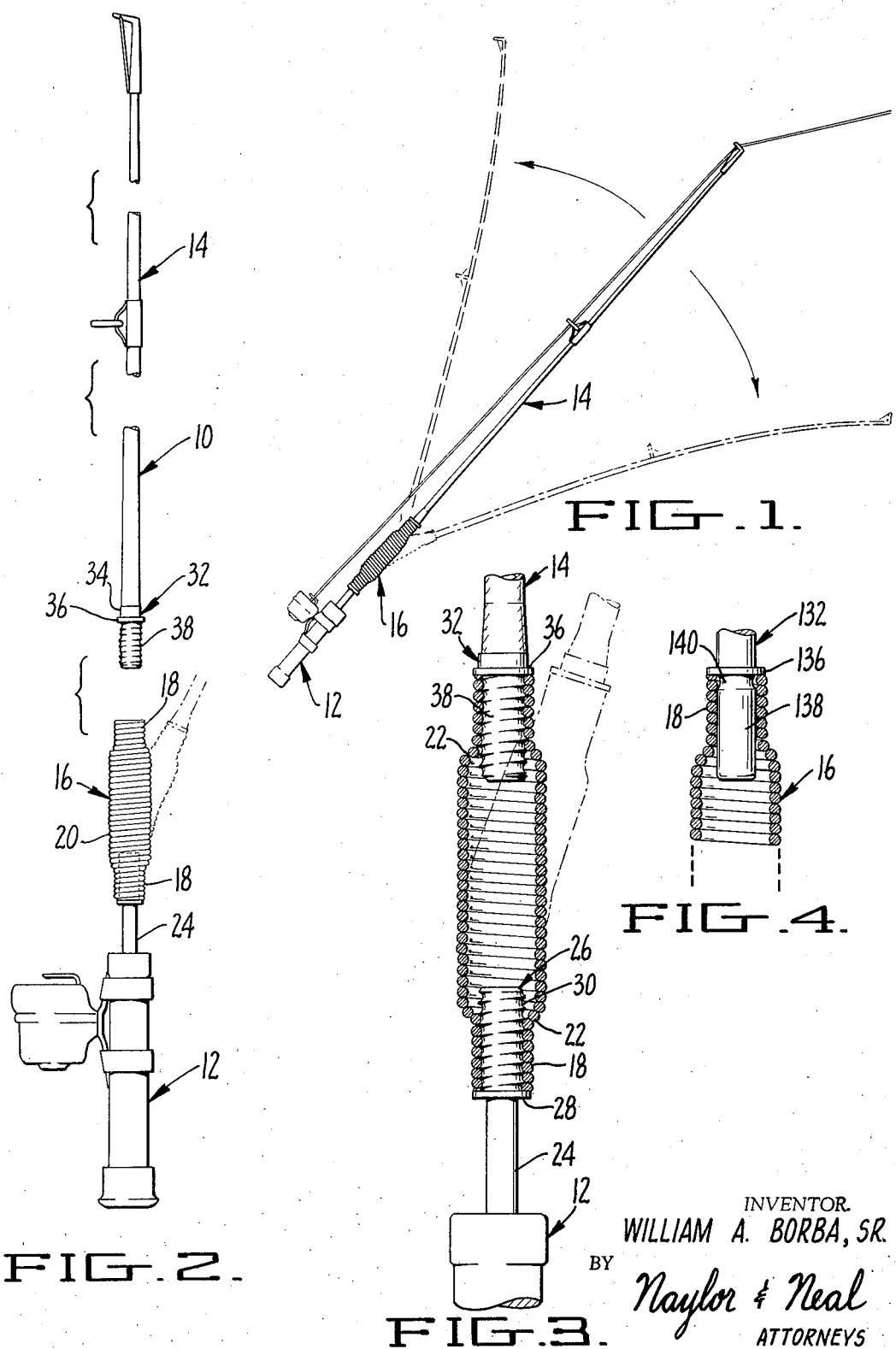

3,507,069
CASTING ROD
William A. Borba, Sr., 524 Spruce Ave.,
South San Francisco, Calif. 94080
Filed Aug. 2, 1968, Ser. No. 749,757
Int. Cl. A01k 87/00
U.S. Cl. 43—18          5 Claims

ABSTRACT OF THE DISCLOSURE

An improved short-coupled casting rod having a handle portion, a rod portion, and an intermediate cylindrically-shaped coil spring member having an enlarged central portion, the handle and rod portions being provided with cylindrically-shaped terminal members adapted to be fitted into and locked to reduced ends of the coil spring.

---

The invention relates in general to fishing or casting rods of the type shown in U.S. Letters Patents Nos. 2,538,306 and 2,538,338 wherein there are shown and described rods having handle, intermediate coil spring, and rod portions, but wherein the rod portion is integral with the coil spring portion and is constituted by a straight or uncoiled length of the wire which forms the spring portion.

Among the objects and advantages of the invention are the following: In a rod of the type described, the provision of a handle and rod interconnector in the form of a tightly coiled cylindrical spring member adapted to be readily connected and disconnected to the handle and rod parts and being thereby adapted to be interchanged with other spring members of different strength and flexure characteristics and adapted to be alternatively connected to other rod members of different strength and flexure characteristics; the provision in a rod of the type described, in its preferred form, of such an intermediate cylindrically-shaped coil spring member having opposite end portions of reduced diameter in relation to the center portion whereby said reduced end portions are more resistant to flexure than the center portion in order to provide an overall rod having a highly desirable and lively spring action factor which is substantially limited to the flexural action of the enlarged central portion of the spring member; and the provision, in its preferred form, of a coil spring interconnector for the handle and rod members, the interconnector having a given length and being provided with end portions of relatively small diameter and a center portion of relatively large diameter, with the resistance to flexure of the spring member being essentially inversely proportional to the ratio of the total length of the smaller end portions to the length of the larger diameter center portion.

These and other objects and advantages of the invention will be apparent from the following description taken in conjunction with the drawing forming part of this specification, and in which:

FIG. 1 is an operational view of the fishing or casting rod of the invention having the preferred embodiment of coil spring interconnector member;

FIG. 2 is an enlarged view of the fishing or casting rod of FIG. 1, the rod member being shown in disconnected relation to the coil spring member;

FIG. 3 is an enlarged view of the spring-containing portion of the fishing or casting rod of FIG. 2, the spring member being shown in diametrical cross section; and FIG. 4 is a view corresponding to the upper part of FIG. 3, but showing a modified form of connector plug carried by the rod and interfitted with the spring member.

With reference to the drawing, the fishing or casting rod indicated generally at 10 is comprised of an inner handle member 12, an outer rod member 14, and an intermediate coil spring member 16, the latter having end portions 18 of reduced diameter and an intermediate portion 20 of greater diameter. Interconnecting spring sections 18 and 20 are tapered sections 22 of abbreviated length. The spring 16 is preferably formed of fairly heavy gauge steel wire, and after its formation the coil spring member 16 is preferably heat-treated and metal-plated for corrosion resistance.

Handle 12 is further comprised of a metal spindle 24 which may be friction-fitted within a socket formed in the upper end of the lower hand-grip portion of the handle, spindle 24 having integral therewith a head or plug member 26 provided with a spring-seating shoulder 28 and an externally threaded surface 30 adapted to be threadably engaged with the tightly wound convolutions of the lower end portion 18 of spring member 16.

Rod extension 14, which is preferably formed of fibreglass, has its lower end connected to a plug connector 32 comprising a socket portion 34 for the rod, a spring-seating shoulder 36, and an externally threaded surface adapted to be threadably engaged with the tightly coiled convolutions of the uper portion 18 of the spring member.

It will be appreciated that with the rod system described, rod 14 may be readily connected and disconnected with respect to spring 16 and the latter may be readily connected and disconnected with respect to handle 12, and thus spring 16 may be interchanged with other springs of the same type having different strength and flexure characteristics and rod 14 may be interchanged with other rods of the same type having different strength and flexure characteristics, with such interchange of parts being selected in accordance with the type of fishing to be encountered.

The reduced diameter portions 18 of the spring, when the connectors 26 and 32 are not in place therein, have, due to their tighter winding, a considerably higher resistance to bending or flexure than does the intermediate portion 20 of the spring. Thus, when connectors 26 and 32 are disposed in place within the spring portions 18, the coextensive portions of the connectors and portions 18 act as solid bodies and flexure of the spring 16 is essentially confined to that which takes place in the intermediate portion 20. The longer the total length of portions 18 is with respect to the length of intermediate portion 20, the more difficult it is to flex or bend the latter. Also, by providing the spring with the reduced diametral portions 18, the bulk and weight of the connectors 26 and 32 is substantially reduced over what it would be if the entire spring had the diametral size of portion 20, thereby reducing the overall weight of the fishing or casting rod. In short, when the preferred and described multiple diameter embodiment of the spring is employed, a lively and resistant controlled spring action is obtained over that which would be obtained when the less desirable single diameter form of spring is employed.

A further advantage of the preferred form of the invention is that the end portions of the connectors 26 and 32 which extend somewhat into the intermediate portion 20 of the spring are disposed in laterally spaced relation from the side wall of the intermediate portion of the spring, and thus these inner end portions of the connectors do not bind against or in any way oppose the obtaining of the desired flexural action from the intermediate portion 20.

In the embodiment of the invention shown in FIG. 4, the connector 132 is shown as having an unthreaded or smooth surfaces 138, the latter being press-fitted within the associated reduced portion 18 of spring 16. The connector 132 is desirably provided just below spring-seating shoulder 136 with an annular groove 140 within which the outermost turn of spring portion 18 may be inwardly pressed for permanent connection between the spring and the rod member. In this embodiment of FIG. 4, the connector for the interconnection of the spring and the handle may be formed and shaped similarly to connector member 132.

It is of course to be pointed out that the connector members to interconnect the rod member with the spring and the handle member with the spring may be sleeved over the terminal portions of the spring or threadably engaged with these terminal portions at the outside of them.

The firm and responsive action of spring 16 is such that a very effective type of manipulation of the subject fishing or casting rod can be accomplished, i.e., a sling-shot action. In this type of manipulation of the rod, the handle is, for example, held in the left hand, the latter being extended in the manner of the hand of one who is holding the handle of a sling-shot, and the tip of the rod is drawn backwardly with the right hand to the degree desired, following which the tip is released to allow spring 16 to lash the rod forwardly and accomplish the casting operation. This type of manipulation of the rod is depicted to some extend in FIG. 1. Such manipulation makes for greater versatility of the subject rod as compared to conventional fishing or casting rods in that such sling-shot action can be employed where the thickness of underbrush or the like is such that the conventional rod could not be satisfactorily whipped backwardly of the user.

What is claimed is:

1. A fishing or casting rod comprising a handle member, a rod member, and an intermediate member in the form of a cylindrically-shaped coil spring, a plug member carried by the inner end of the rod member and adapted to be interfitted with one end portion of said spring, and a plug member carried by the outer end of the handle member and adapted to be interfitted with the other end portion of said spring, said intermediate member having an intermediate portion which interconnects said end portions and is integral therewith, said intermediate portion being of greater diameter than said end portions.

2. The fishing or casting rod of claim 1, said plug members having spirally grooved surfaces adapted to extend within the end portions of said intermediate member and be threadably engaged therewith.

3. The fishing or casting rod of claim 2, said end portions being of like diameter and being interconnected with said intermediate portion by tapered portions of abbreviated length.

4. The fishing or casting rod of claim 1, said plug members being adapted to complementally fit within said end portions, and means adapted to interconnect said plug members with said end portions and inhibit relative endwise movement therebetween.

5. A fishing or casting rod comprising a handle member, a rod member, and an intermediate member in the form of a cylindrically-shaped coil spring, a plug member carried by the inner end of the rod member and adapted to be interfitted with one end portion of said spring, and a plug member carried by the outer end of the handle member and adapted to be interfitted with the other end portion of said spring, said intermediate member having an intermediate portion which interconnects said end portions and is integral therewith, said intermediate portion being of greater diameter than said end portions, said said spring being one-piece, being formed of a wire having a constant cross-sectional diameter, and being formed so that the adjacent turns thereof are normally in full contactual engagement with each other.

References Cited
UNITED STATES PATENTS

| | | | |
|---|---|---|---|
| 1,174,526 | 3/1916 | Stoddart | 177—127 |
| 2,351,734 | 6/1944 | Backe | 43—18 |
| 2,559,934 | 7/1951 | Briney | 43—18 |

WARNER H. CAMP, Primary Examiner

U.S. Cl. X.R.

287—86